Feb. 23, 1971     J. LYMAN     3,565,495

MAGNETIC SUSPENSION APPARATUS

Filed Aug. 5, 1969

INVENTOR.
Joseph Lyman

BY

ATTORNEYS.

United States Patent Office 3,565,495
Patented Feb. 23, 1971

3,565,495
MAGNETIC SUSPENSION APPARATUS
Joseph Lyman, Northport, N.Y., assignor to Cambridge Thermionic Corporation, Cambridge, Mass., a corporation of Massachusetts
Filed Aug. 5, 1969, Ser. No. 847,616
Int. Cl. F16c 39/06
U.S. Cl. 308—10                                    7 Claims

ABSTRACT OF THE DISCLOSURE

Magnetic suspension apparatus for suspending a movable body between a pair of electromagnets exerting radial centering forces and opposed axial pulling forces in which each electromagnet comprises an inner cylindrical permeable member and an outer cylindrical permeable member coaxial therewith having an electromagnet coil situated in the space between these two cylindrical members.

BACKGROUND OF THE INVENTION

The present invention relates to electromagnetic suspension systems, and is particularly concerned with providing a system which accommodates itself to, and corrects for, substantial skewing forces as well as substantial longitudinal and transverse forces.

Systems for magnetic suspension of an object without any fluid flotation means have relied upon the use of a pair of electromagnets exerting radial centering forces and opposed axial pulling forces in which the magnets are variably energized according to the relative rate of movement and displacement of the object. Such a system is described in my application Ser. No. 691,284, filed Dec. 18, 1967, now U.S. Pat. No. 3,473,852. In accordance with that system, a movable body is suspended by use of a pair of electromagnetic force appliers. These force appliers are controlled by stable amplifier means which are mainly responsive to velocity of motion of the body and secondarily responsive to the displacement of the body from a predetermined position between the force appliers. In said system, each electromagnet is composed of an armature and a re-entrant cup type stator which has a coil winding inserted inside. The inner and outer pole faces on the stator and armature are substantially coplanar and are configured with confronting circular projections or ridges to produce substantial radial force components in response to, and for overcoming, slight departures from coaxial alignment between the electromagnets and their armatures. Such an arrangement will accommodate only limited cocking or skewing of the suspended body caused by angular movement of the support or frame containing the re-entrant cup type stators, magnet reaction torques, or gyroscopic or other forces on the suspended body.

In order to obtain magnetic suspension apparatus which will accommodate substantial cocking of the suspended body, several different approaches could be considered. For example, one could try to reshape the locus of the electromagnet pole faces from a substantially planar locus to a spherical-segment locus and reshape the cooperating armature faces into a spherical-segment locus of slightly smaller radius, the center of the sphericities being at the midpoint of the suspended body. While such an arrangement will permit increased cocking or skewing of the suspended body, the arrangement actually decreases the amount of translational movement of the suspended body from side to side relative to the stators of the electromagnets.

Another alternative design would be to widen the air gap between the stator and the armature. This arrangement would permit increased cocking of the suspended body without narrowing the range of translational movement of the suspended body. However, this design would bring about impairment of the magnetic forces, and would require excessive power to maintain control of the suspended body. With the increase in power, an excessive increase in heat would occur.

The magnetic suspension system might also be designed to have an exceptionally long shaft for the suspended body. This approach would permit increased cocking of the suspended body without impairing the translational movement. By having a normal air gap between the stator and armature, excessive power requirements would be avoided. However, a magnetic suspension system having an elongated shaft for the suspended body would be difficult to make, would sacrifice needed compactness, and would result in a sacrifice of rigidity.

SUMMARY OF THE INVENTION

An object of the present invention is to provide an improved and more efficient magnetic suspension apparatus.

Another object of the present invention is to provide a system for suspending a movable body between a pair of electromagnets which system will accommodate substantial cocking or skewing of the suspended body.

A further object of the present invention is to provide an improved magnetic suspension system which will accommodate relative displacements between the suspending portion and the suspended apparatus, including angular as well as translational components.

Still another object of this invention is to provide a DC motor with a magnetically suspended rotor which will accommodate a relatively large cocking or skewing angle of the suspended rotor during operation in a variety of different environments.

In accordance with the present invention, these and other objects are met by use of a pair of electromagnets of a special configuration between which a movable body or object is suspended. The electromagnets are controlled in known manner by stable amplifier means mainly responsive to velocity of the change of displacement of the body and secondarily responsive to the magnitude of displacement of the body from a predetermined position between the electromagnets. Each of the electromagnets comprises an inner cylindrical permeable member and an outer cylindrical permeable member coaxial therewith, the electromagnet coil being situated in the space between these two cylindrical members whereby a direct current through the coil will induce magnetic flux in one direction in the inner cylindrical member parallel to the axis and will induce magnetic flux in the opposite direction in the outer cylindrical member. At one end of the specially constructed electromagnet, the outer cylindrical member has a permeable portion extending inward and having a pole face juxtaposed to one end of the inner cylindrical permeable member. The inner cylindrical permeable member, at its opposite end, has a permeable portion extending outward and having a pole face juxtaposed to the near end of the outer cylindrical member.

The cooperating pole faces of the outwardly extending portion of the inner cylindrical member and the near end of the outer cylindrical member are positioned nearer to the center of the movable body, and the other pair of pole faces are of smaller diameter, and where forces permeable member is located farther from the center of the movable body, where greater relative movement due to cocking or skewing can be accommodated because the pole faces are of smaller diameter, and where forces opposing cocking or skewing act at a greater moment arm.

BRIEF DESCRIPTION OF THE DRAWINGS

Other and further objects, advantages, and features of the invention will be apparent to those skilled in the art from the following detailed description thereof, taken in conjunction with the accompanying drawings, in which.

DESCRIPTION OF THE PREFERRED EMBODIMENTS

Figure 1:
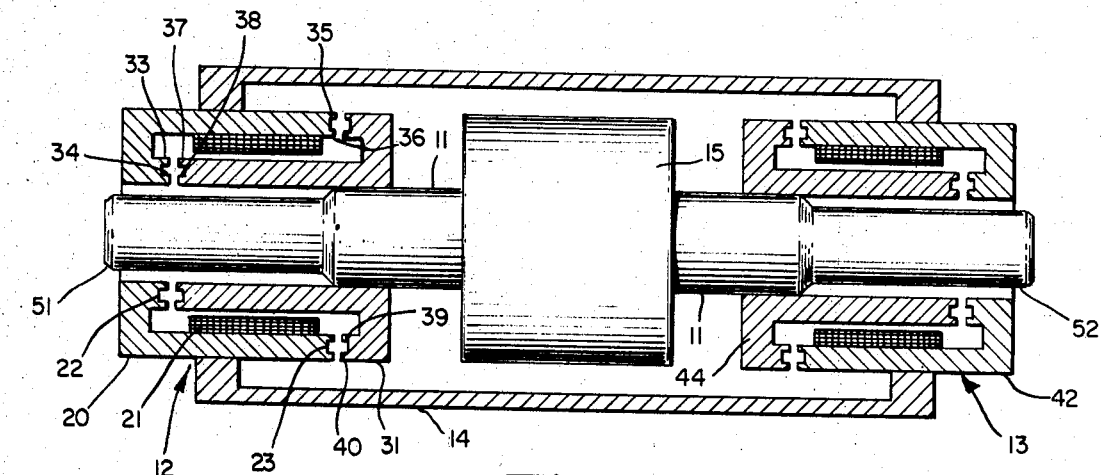
FIG. 1 shows an embodiment of the invention, with portions being shown in cross section.

In FIG. 1, which illustrates an embodiment of the present invention, a rigid body 11, such as a cylinder, is suspended between two electromagnets 12 and 13 inside a stationary frame 14. These electromagnets are energized by direct current, the intensity of energization being differentially controllable. For imparting high-speed rotation to suspended body 11 a rotating induction field may be produced by motor 15 which surrounds the suspension body.

In order to realize the desired operating characteristics, the axial force applied by each electromagnet is substantially greater than the forces to be exerted on the suspended body 11 in the gravitational or accelerated environments in which it is to be suspended. Suspended body 11 is illustrated as a figure of revolution about its longitudinal axis, for example a cylinder. It may take the form of a gyroscope rotor, or may be vertically arranged as a rotary mass from which a centrifuge chamber is to depend. As with other magnetic suspension apparatus, brushes and mechanical bearings of conventional DC motors, with their attendant problems, are eliminated.

Each of the electromagnets 12 and 13 comprises two cylindrical permeable members so constructed and arranged as to exert on suspended body 11 a force parallel to the axis thereof when said body is aligned with the axis of the electromagnets, and to exert a force component transverse to the axis of suspended body 11 when it is slightly displaced from the position of coincidence of its axis with the axis of the electromagnets.

The outer cylindrical member 20 of electromagnet 12 is composed of permeable material. The electromagnet coil illustrated in the drawing is a stationary coil winding 21 adjacent to outer cylindrical permeable member 20 of electromagnet 12. This electromagnet coil takes the form of a thin cylindrical shell in which overlapped windings are present in a suitable plastic matrix, such as epoxy. Outer cylindrical permeable member 20 of electromagnet 12 is provided with an inner pole face 22 and outer pole face 23. An inner cylindrical permeable member 31 of electromagnet 12 is also composed of permeable material and is fixed to suspended body 11. This inner cylindrical permeable member 31 of electromagnet 12 is arranged to cooperate with pole faces 22 and 23 in defining small annular air gaps in the path of the magnetic flux produced by current through coil winding 21 of the electromagnet coil situated in the space between the two cylindrical permeable members. Actually, coil winding 21 induces flux in opposite directions in each of the two cylindrical permeable members of electromagnet 12.

Preferably, a plurality of concentric circular projections or ridges are provided on each of the annular pole faces 22 and 23 of outer cylindrical permeable member 20 of electromagnet 12 and corresponding concentric circular projections or ridges are provided on the confronting pole faces of inner cylindrical permeable member 31 of this electromagnet. In the illustrated embodiment, the inner pole face 22 is provided with two circular projections 33 and 34 and the outer annular face 23 is provided with two circular projections 35 and 36. Matching concentric circular projections or ridges 37, 38, 39 and 40 are provided on inner cylindrical permeable member 31 of electromagnet 12.

Electromagnet 13 is similarly constructed, with an outer cylindrical permeable member 42 having inner and outer pole faces with circular projections or ridges thereon, and with a inner cylindrical permeable member 44 having circular projections or ridges on pole faces directly opposite those of outer cylindrical permeable member 42.

Outer cylindrical permeable members 20 and 42 of the respective electromagnets are fixedly supported in axial alignment in any well known manner, such as by means of the stationary frame 14, and are spaced from the oppositely extending portions 51 and 52 of suspended body 11 in order to permit its rotation and displacement. Inner cylindrical permeable members 31 and 44 of the two electromagnets are attached to suspended body 11 and spaced apart from the coil winding 21 of the electromagnet coil adjacent to outer cylindrical permeable members 20 and 42.

If desired, the system as shown in the drawings may be horizontally disposed. If it is operated in the earth's gravitational field, the electromagnets 12 and 13 are then required to exert vertical force components equal to the weight of the suspended mass. Actually, the improved apparatus of the present invention permits the apparatus to be used in a variety of different environments, with various amounts of force due to gravity and/or vehicle acceleration. The magnetic suspension system will accommodate relative displacements between the suspending portion and the suspended apparatus, including angular as well as translational components.

The outer pole faces of the electromagnets are far from coplanar with the inner pole faces, being much nearer the middle of suspended body 11. Accordingly, the smaller radius pole faces such as pole faces 33 and 34 act at a long moment arm from the center of body 11 to oppose cocking of suspended body 11. The limited diameter of the inner pole faces makes it possible to accommodate a much greater cocking angle than would be possible if the large diameter outer pole faces were as far from the middle. The greater diameter pole faces, located much nearer the middle, provide their full effectiveness in opposing translation of the suspended mass, and augment the forces exerted by the more distant pole faces in opposition to cocking. Increased reliability of the magnetic suspension apparatus is thereby obtained, widening or extending the utility of such apparatus for long-term service in varying environments.

Figure 2:
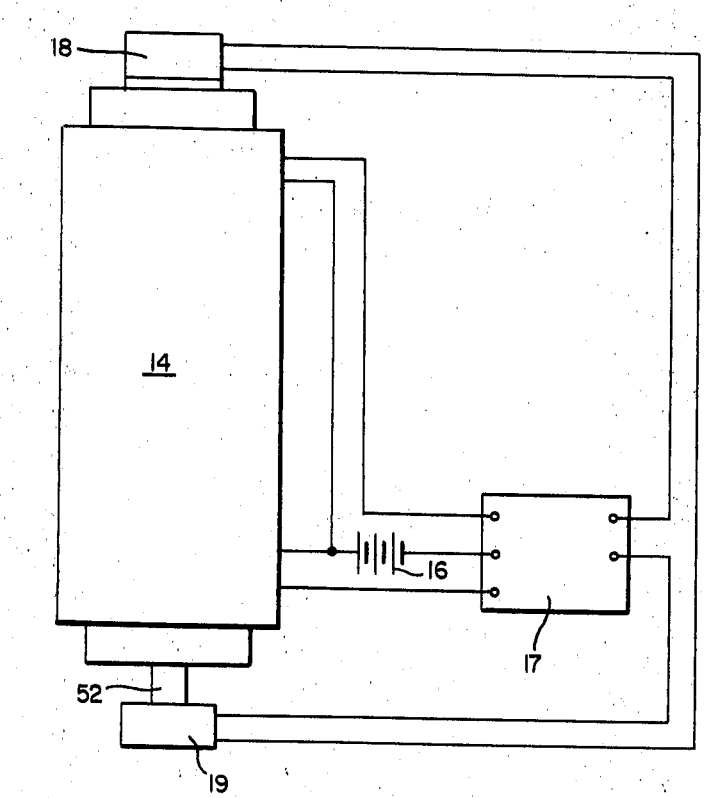
FIG. 2 is a highly schematic drawing which illustrates means for regulating or controlling the suspension system of the present invention.

FIG. 2 schematically illustrates means for regulating or controlling apparatus like that shown in FIG. 1. The electromagnets inside frame 14 are energized by a source 16 and amplifier 17, as, for example, in accordance with the means described in my application Ser. No. 691,284. The input signal to amplifier 17 comprises a displacement signal component produced by displacement pickoff 18 and a rate signal component produced by rate generator means 19. The intensity of energization with which the electromagnets are energized is differentially controllable by the output of amplifier 17 which has high stability.

Displacement pickoff 18 may comprise a photoelectric pickoff having a light source, a reflector and differential photoelectric pickup device for sensing relatively small displacement of the suspended body or object.

Rate generator means 19 can comprise a permanent magnet fixed to extending portion 52 of the suspended body which is arranged to cooperate with coils as an electrodynamic signal source. Movement of the suspended body causes either an increase or a decrease in the magnetic flux linkage with the turns of the coils in the rate generator means 19, thereby resulting in an output voltage of a polarity proportional to the rate of movement of the suspended body.

The output of the rate generator 19 is connected in series with the displacement pickoff output circuit of displacement pickoff 18, the series combination of these outputs being connected to the input terminals of the amplifier 17. These outputs are so polarized that when the suspended body is displaced in one direction from its neutral position and moving in the same direction so that the displacement is increasing, the output of the displacement pickoff 18 is in series aiding the rate generator output. Conversely, when the suspended body is moving toward its neutral position, the output of the displacement pickoff 18 is in series opposition to the rate generator output.

The system must be so constructed and arranged as to minimize and preferably avoid disadvantageous intercoupling between the rate generator and the displacement pickoff, and further, to minimize and preferably avoid disadvantageous intercoupling between either of these sensing devices and the electromagnets. Along with these requirements, it is advisable to keep the sensitivity of the rate generator means high in relation to the displacement sensitivity. This factor, together with high stability of the amplifier 17, results in stable positional control of the suspended body, substantially free from hunting.

While, for convenience, the displacement pickoff is positioned at the opposite end of suspended body from the rate generator, it will be appreciated that in view of the difference between the principles of operation of the displacement pickoff 18 and the rate generator 19, these devices may be arranged adjacent each other at one end of the suspended body.

From the foregoing, it will be seen that this invention is well adapted to obtain all of the ends and objects hereinabove set forth, together with other advantages which are obvious and which are inherent in the system.

Obviously, many other modifications and variations of the invention as hereinbefore set forth may be made without departing from the spirit and scope thereof.

What is claimed is:
1. Magnetic suspension apparatus comprising;
a movable object having a longitudinal axis;
and means including first and second magnetic force appliers and energization means therefor for magnetically suspending said object substantially in a desired position;
 each of said first and second magnetic force appliers comprising a coil normally aligned with said longitudinal axis,
 and first and second permeable bodies coaxial with said coil and defining two pairs of coaxially aligned pole faces, one pair being positioned farther from the middle of said movable obejct than the other pair.

2. The magnetic suspension apparatus of claim 1, wherein the pair of pole faces positioned nearer the middle of said movable body have a greater diameter than the other pair of pole faces.

3. The magnetic suspension apparatus of claim 2, wherein the first magnetic force applier and the second magnetic force applier are symmetrically disposed relative to the middle of said suspended object.

4. Magnetic suspension apparatus comprising:
a movable object having a longitudinal axis;
and means including first and second magnetic force appliers and energization means therefor for magnetically suspending said object substantially in a desired position;
 each of said first and second magnetic force appliers comprising a coil normally aligned with said longitudinal axis,
 and first and second permeable bodies coaxial with said coil and defining two pairs of coaxially aligned pole faces, one pair being positioned farther from the middle of said movable object than the other pair,
  the first permeable body including a cylindrical portion surrounded by said coil and a portion at one end extending outward to a diameter exceeding the coil diameter,
  the second permeable body including a cylindrical portion surrounding said coil and having one end adjacent said outward-extending portion of said first permeable body, a pair of adjacent pole faces being thus defined, and having at its opposite end a portion extending inward and adjacent to the other end of said first permeable body, another pair of adjacent pole faces being thus defined.

5. The magnetic suspension apparatus of claim 4, wherein, the coil is secured to the inner surface of the second permeable body and spaced from the other cylindrical surface of the first permeable body.

6. The magnetic suspension apparatus of claim 5, wherein, the first permeable body is fixed to the movable object.

7. Magnetic suspension apparatus comprising;
a movable object having a longitudinal axis;
a first electromagnetic suspension force applier at one end of said movable object and second electromagnetic suspension force applier at the opposite end of said movable object;
means for energizing both said electromagnetic suspension force appliers for causing said force appliers to exert oppositely directed pulls on the object;
and means including movement detecting means for controlling the energization of said first and second electromagnetic suspension force appliers to stabilize the position of said object;
said first and second electromagnetic suspension force appliers each comprising a coil normally aligned with said longitudinal axis,
 and first and second permeable bodies coaxial with said coil and defining two pairs of coaxially aligned pole faces, one pair being positioned farther from the middle of said movable object than the other pair.

References Cited
UNITED STATES PATENTS

| | | | |
|---|---|---|---|
| 2,436,939 | 3/1948 | Schug | 308—10 |
| 3,124,962 | 3/1964 | Hirtreiter | 308—10 |
| 3,146,038 | 8/1964 | Lautzenhiser | 308—10 |
| 3,243,238 | 3/1966 | Lyman | 308—10 |
| 3,356,425 | 12/1967 | Carriere | 308—10 |
| 3,473,852 | 10/1969 | Lyman | 308—10 |

WARREN E. RAY, Primary Examiner

R. SKUDY, Assistant Examiner

U.S. Cl. X.R.

74—5.6

PO-1050
(5/69)

UNITED STATES PATENT OFFICE
CERTIFICATE OF CORRECTION

Patent No. 3,565,495        Dated  Feb. 23, 1971

Inventor(s)  J. Lyman

It is certified that error appears in the above-identified patent and that said Letters Patent are hereby corrected as shown below:

Column 2, line 65, should be corrected to read:

--pole faces which includes one end of the inner cylindrical

Signed and sealed this 19th day of October 1971.

(SEAL)
Attest:

EDWARD M. FLETCHER, JR.    ROBERT GOTTSCHALK
Attesting Officer            Acting Commissioner of Pate